United States Patent Office 3,171,285
Patented Mar. 2, 1965

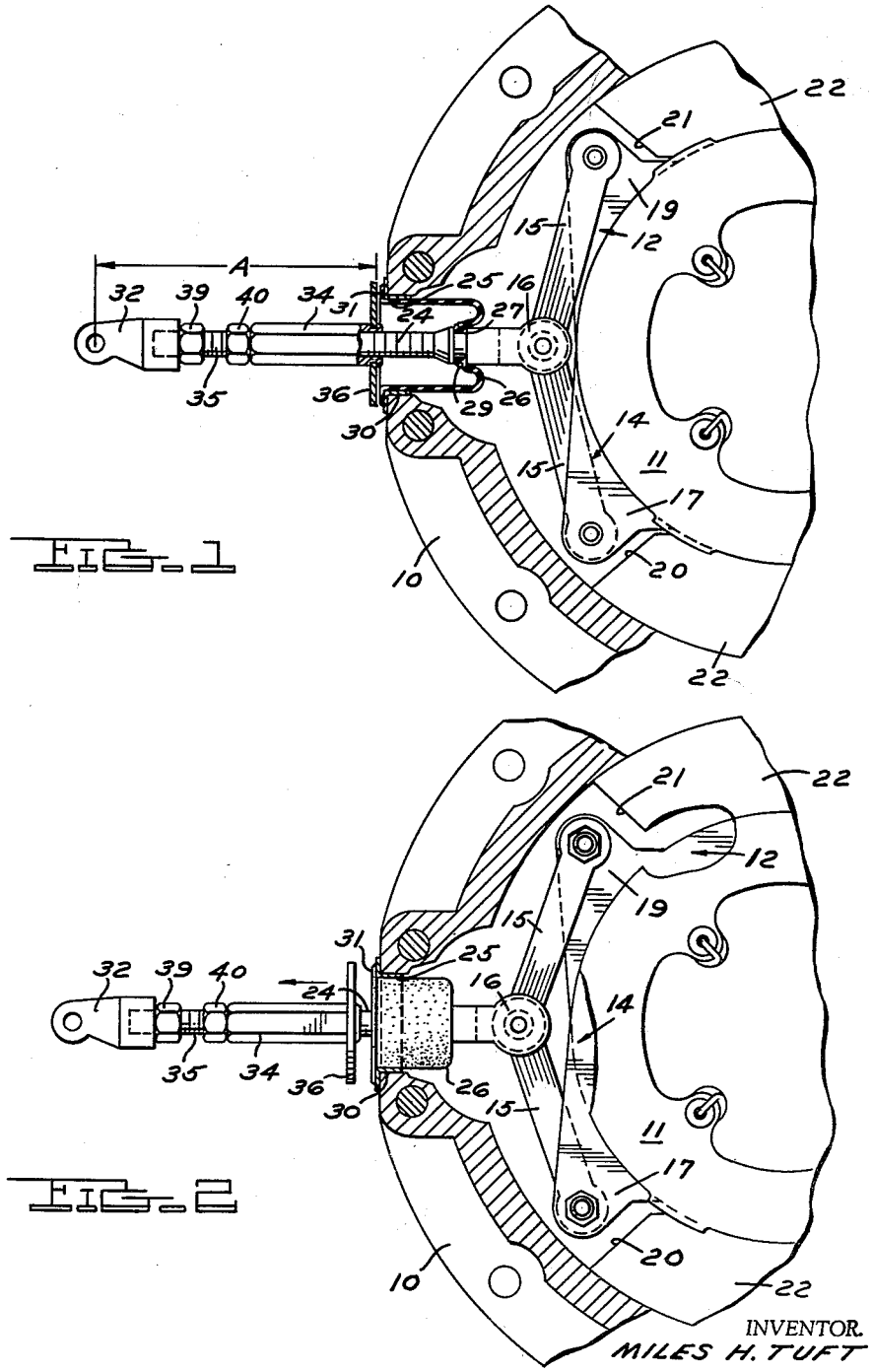

3,171,285
BRAKE ACTUATOR ASSEMBLY
Miles H. Tuft, Birmingham, Mich., assignor to Ford Motor Company, Dearborn, Mich., a corporation of Delaware
Filed Jan. 2, 1964, Ser. No. 335,163
4 Claims. (Cl. 74—18.2)

This invention relates to brake actuators and more particularly to actuators for tractor brakes located within a housing and operating in a bath of oil.

Tractors, both agricultural and industrial, sometimes are provided with disc brakes located within the rear axle housing and operating in a bath of oil. In one type of disc brake, a pair of confronting discs are relatively rotated in order to apply the brake. The brake may be mechanically actuated by a reciprocated actuator extending through the housing. A seal is required between the actuator and housing to prevent entrance of dirt and loss of oil from the housing. In brake constructions of this type, as the brake is applied, the brake discs are rotated about their common axis a small amount so as to laterally move the actuator a small distance. Therefore, a flexible seal is required between the actuator and housing to permit such movement as well as reciprocating movement of the actuator.

In the brake actuator assembly of the present invention, the seal between the actuator and housing is formed of relatively thin, synthetic rubber (including rubberlike material) so as not to be unduly affected by low temperatures which otherwise would make the brakes difficult to apply. The seal, which may be on the forward side of the tractor rear axle housing and subject to damage from brush and other objects, is protected by a member on the outside of the housing which covers the seal when the brakes are released. This cover member may function not only to protect the seal against mechanical damage and aging due to sunlight, etc., but also to serve as a stop to limit movement of the actuator in the brake release direction. In order to maintain a fixed adjustment of this cover member relative to the housing, the brake actuator may be made adjustable to change the length of the actuator between the member and its connection with the brake without disturbing the adjusted length between the member and a connecting means for reciprocating the actuator.

Among the objects of the present invention are to provide an improved brake actuator assembly in which a relatively thin, flexible seal is covered and protected by a member carried by the actuator, to provide such an assembly in which the actuator may be adjusted for wear of the brake without affecting the position of the cover member relative to the housing, and generally to improve brake actuator assemblies of the type described.

Other objects, and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

FIGURE 1 is a side elevation of a brake actuator assembly according to the present invention, the brake actuator being shown in released position, and portions of the assembly, the brake and the housing being broken away or shown in vertical section.

FIGURE 2 is an elevation similar to FIGURE 1, the brake actuator being shown in brake-applied position.

Referring now to the drawings, a tractor rear axle housing 10 is provided with a disc brake assembly 11. The disc brake assembly 11 may be of the Lambert type generally shown in Patent 2,874,807 of February 24, 1959, in which a pair of confronting discs 12 and 14 are relatively rotated a few degrees to apply the brake.

The discs 12 and 14 are rotated by a pair of links 15—15, one link being pivotally connected to each disc, the opposite ends of the links being pivotally connected to a clevis 16 of the brake actuator. Movement of the clevis 16 away from the discs 12 and 14 causes the links 15 to actuate the brake.

As the brake is applied, each disc is rotated slightly and, in addition, the two discs will be rotated together a few degrees until an ear 17 or 19 located on the discs 12 or 14 has moved against a stop 20 or 21 formed at the ends of a brake housing plate 22 mounted on the axle housing 10. When the tractor is braked when moving forwardly the discs will be carried against the stop 20 and, when braked when moving rearwardly, against the stop 21.

The brake actuator includes a threaded shank 24 which may be integral with the clevis 16 and projects through a cylindrical opening 25 in the housing 10. A flexible, synthetic rubber diaphragm or boot 26 seals between the clevis 16 and the housing. Preferably, the inner circumference of the boot 26 is located within a circular groove 27 in the clevis and is held in position by a garter spring 29. The outer circumference of the boot 26 may be bonded to a metallic ring 30 which is a press fit within the opening 25. Preferably, the outer periphery 31 of the boot extends radially of the housing 10 to facilitate application or removal from the housing.

The clevis 16 is connected to a second clevis 32 at the outer end of the actuator assembly. Preferably, the connection between the clevises 16 and 32 comprises an internally threaded sleeve 34 threadedly engaged with the shank 24 of the clevis 16 and threadedly engaged with a bolt 35 rotatably mounted in the clevis 32. A cover member 36 is carried on the sleeve 34 and overlies the boot 26 when the actuator is in brake-released position. If desired, the cover member 36 may be utilized as a stop to limit releasing movement of the brake due to its engagement with the radial portion 31 of the boot or with the housing adjacent the boot, thus limiting return pedal travel.

As previously described, the sleeve 34 is connected to the clevis 32 by the bolt 35 threadedly engaged with the sleeve and rotatable within the clevis. Lock nuts 39 and 40 may be provided on the bolt 35 to be tightened against the ends of the clevis 32 and sleeve 34 to prevent rotation of the bolt within the clevis and to prevent rotation of the sleeve on the bolt.

The clevis 32 is engaged by a brake link or lever (not shown) to move the actuator assembly outwardly for applying the brake. Upon release of the force on the clevis 32, the disc brake assembly, which is spring-biased towards brake-released position, will retract the actuator assembly.

In the initial adjustment of the brake assembly, the distance A between the clevis 32 and the cover member 36 is adjusted so that when the brake is released the cover member will engage or substantially engage the outer periphery of the boot 26 and will cover the boot to protect it against damage. This is accomplished by rotating the bolt 35 within the sleeve 34, the parts being locked in adjusted position by tightening the lock nut 40 against the end of the sleeve. Once this adjustment is made, it is unnecessary to disturb the adjustment when adjusting the actuator assembly to compensate for wear of the brake.

To adjust for wear, the sleeve 34 is turned on the threaded shank 24 of the clevis 16, the lock nut 39 being loosened from engagement with the clevis 32 to permit the bolt 35 to rotate with the sleeve and thereby not disturb the distance A between the clevis 32 and the cover member 36. After adjusting, the lock nut 40 is re-tightened against the clevis to retain the parts in adjusted position.

I claim:

1. A brake actuator assembly for a brake received within a housing containing oil, said assembly comprising a housing having an opening, a reciprocating brake actuator received within the opening, a resilient, boot-type seal received within the opening and forming a fluid-tight seal between the actuator and the housing about the margin of the opening, connecting means at the outer end of the actuator for drawing the actuator out of the housing to apply the brake, a cover member carried by the actuator and substantially closing the opening in the housing to protect the seal against damage, the actuator having threadedly engaged telescoping portions located between the member and the brake to adjust for wear of the brake without altering the distance between the connection means and the cover member.

2. A brake actuator assembly for a brake received within a housing containing oil, said assembly comprising a housing having an opening, a reciprocating brake actuator received within the opening, a resilient, boot-type seal received within the opening and forming a fluid-tight seal between the actuator and the housing about the margin of the opening, connecting means at the outer end of the actuator for drawing the actuator out of the housing to apply the brake, a cover member carried by the actuator and substantially closing the opening in the housing to protect the seal against damage, the actuator having threadedly engaged telescoping portions located between the member and the brake to adjust for wear of the brake without altering the distance between the connecting means and the member, the cover member serving as a stop to limit movement of the actuator in brake-releasing direction.

3. A brake actuator assembly for a brake received within a housing containing oil, said assembly comprising a housing having an opening, a reciprocating brake actuator received within the opening, a resilient seal received within the opening and forming a fluid-tight seal between the actuator and the housing about the margin of the opening, connecting means at the outer end of the actuator for drawing the actuator out of the housing to apply the brake, a cover member carried by the actuator and substantially closing the opening in the housing to protect the seal against damage, the actuator including a sleeve supporting the cover member and having a threaded bore and an element threadedly engaged with the bore of the sleeve and connected with the brake.

4. A brake actuator assembly for a disc brake received within a housing containing oil and including a pair of plates relatively rotated to apply the brake, said assembly comprising a housing having an opening, a reciprocating brake actuator received within the opening and adapted to be linked with the plates, a resilient, boot-type seal received within the opening and forming a fluid-tight seal between the actuator and the housing about the margin of the opening, connecting means at the outer end of the actuator for drawing the actuator out of the housing to apply the brake, and a cover member carried by the actuator and substantially closing the opening in the housing when the brake is released to protect the seal against damage, application of the brake withdrawing the cover member from the opening in the housing.

References Cited in the file of this patent

UNITED STATES PATENTS

| | | |
|---|---|---|
| 858,557 | Banning | July 2, 1907 |
| 2,861,456 | Soderberg | Nov. 25, 1958 |